United States Patent

[11] 3,599,672

| [72] | Inventor | Ludovicus Hendrikus Baghuis<br>Vliedberg/Vlijmen, Netherlands |
|---|---|---|
| [21] | Appl. No. | 877,382 |
| [22] | Filed | Nov. 17, 1969 |
| [45] | Patented | Aug. 17, 1971 |
| [73] | Assignee | D. Stempel A.G.<br>Frankfurt am Main, Germany |
| [32] | Priority | Nov. 16, 1968 |
| [33] | | Germany |
| [31] | | P 18 09 319.1 |

[54] PISTON VALVE
5 Claims, 3 Drawing Figs.

[52] U.S. Cl. .................................................. 137/625.48,
     251/360
[51] Int. Cl. .................................................. F16k 11/07
[50] Field of Search ................................................ 137/625.48,
     625.68, 625.69; 251/367, 360

[56] References Cited
UNITED STATES PATENTS
3,211,164  10/1965  Bender et al. .................. 137/625.69 X

*Primary Examiner*—Alan Cohan
*Assistant Examiner*—Michael O. Sturm
*Attorney*—Gordon W. Hueschen ABSTRACT: This invention concerns a piston valve, preferably multipath valve, with a housing fitted with boreholes to add or withdraw a pressure fluid, and provided with a threaded bore therethrough into which at least two sleeves are threadedly received and cemented. The sleeves form guiding edges and pressure chambers, and are fitted with a sliding piston, axially slidable in the sleeve and having segments of different diameters.

Inventor:
LUDOVICUS H. BAGHUIS

Inventor:
LUDOVICUS H. BAGHUIS

PISTON VALVE

BACKGROUND OF THE INVENTION

In the known piston valves (U.S. Pat. No. 3,211,164) of this type the guiding edges and pressure chambers are formed by a single sleeve which is time consuming to set up. The single sleeve is threadedly received into a bore and cemented so as to prevent leakage losses between inlet and outlet passageways for the pressure fluid. In such a piston valve the disadvantage lies in the difficulty to manufacture the pressure chambers and the carefully worked guiding edges and bearing surfaces for the sliding piston. Curving, shifting of the center, uneven roundness of bore, and uneven spacing of the guiding edges are unavoidable without a subsequent individual finishing job.

It is further known that in piston valves (German Gebrauchsmuster 1,518,722) the pressure chambers can be formed from separate sleeves and spacers which are inserted into a precisely worked bore of a housing. With such valves, in addition to manufacturing faults, such as curving, shifting of the center, uneven roundness, and uneven spacing, faults in concentricity and in angles at the frontal planes of the guiding edges are also encountered. The fitting of the sleeves into the housing bores causes leakage losses during the movement or "distortion" when the sleeves are pressed in. A subsequent individual finishing job is unavoidable.

In another known method for manufacturing such valves the intermediate spaces between the bearing and the stand are produced by casting, in order to align the shaft bearings (German Pat. No. 268,746). This method, however, does not provide uniform distances between the guiding edges.

It is the purpose of this invention to provide a piston valve which ensures exact distances between the guiding edges and the lowest possible loss from leakage between the pressure chambers without requiring a reworking to achieve an exact alignment of the bores for the sliding piston.

SUMMARY OF THE INVENTION

According to this invention at least two sleeves are threadedly received by a threaded bore and cemented therein one behind the other. The frontal planes of the sleeves are evenly spaced without spacers and form the guiding edges for a piston slidably movable in their respective bores. Also, the frontal planes of the sleeves, together with the interior thread of the housing, define pressure chambers which communicate with fluid inlet and outlet passageways.

DESCRIPTION OF THE PREFERRED EMBODIMENTS

Figure 1:
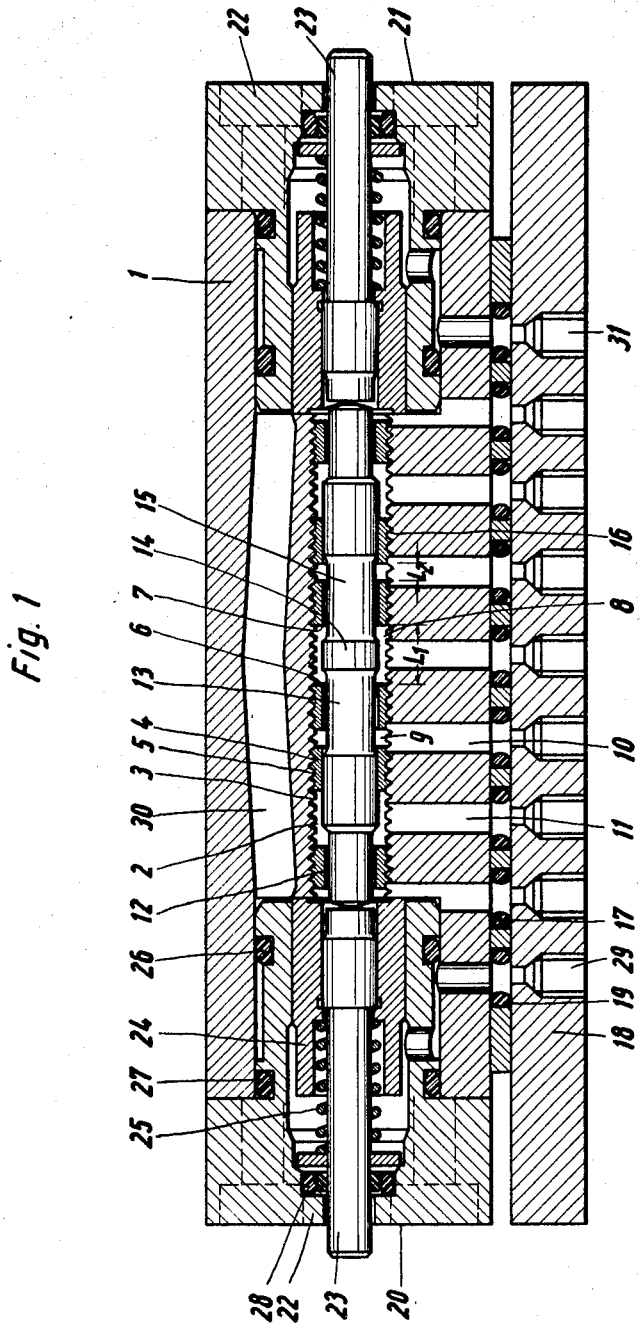
FIG. 1 shows a sectional view of a piston valve according to the invention.

Referring to FIG. 1, a housing 1 made of aluminum alloy, steel, brass, or other pressure resistant material of low porosity is provided with a flat surface, or can also be a cylindrical body. A longitudinal bore 2 is provided therein with an internal thread 3 of a desired thread form. External thread 5 of sleeves 4 is engaged with the internal thread 3 of bore 2; the frontal planes 6 and 7 of the sleeves define pressure chambers 8 and 9, respectively. The pressure chambers are provided with bores 10 and 11 in the housing which serve as inflow or outflow passageways for the pressure fluid (hydraulic or pneumatic medium). Within bores 12 of sleeves 4 the sliding piston 13 is housed so that it can be moved along its axis. This piston is provided with at least two different diameters 14 and 15. Between the larger diameter and the bores 12 of sleeves 4 there is a play of about 1/1000 mm. Between the internal thread 3 of housing 1 and the external thread 5 of sleeves 4 is hardened synthetic adhesive 16 such as Locktite, Stalock, Sealant No. 500 manufactured by the Multi-Purpose Chemical Corporation, Broadview, Illinois, for example.

Passageways 10 and 11 for the entry or exit of the pressure fluid terminate at surface 17 of housing 1. At this point they can be suitably connected with a mounting plate 18, whereby seal is achieved by the inserted O-rings 19. The sliding piston 13 can be activated by hand, electromechanically, hydraulically, or pneumatically.

Housing 1 is closed at the two sides 20 and 21 with cover which is firmly connected to housing 1 by means of screws (not visible). The activating piston 23 is housed in sleeve 24, which in turn is housed in cover 22. Sleeve 24 is held at the indicated position by spring 25 and/or directional pressure. Since this arrangement is present at both sides of the slide, both activation pistons remain in the indicated position when neither is engaged. When an activating piston 23 is engaged (activated), spring 25 on the opposite side is compressed; upon completion of the activation the spring relaxes, and the sliding piston 13 resumes its indicated position. The sides are sealed by seal rings 26, 27 and 28. Hydraulic driving of the piston valve is achieved via the passageways 29 to 31 through which a suitable pressure generating means such as a hydraulic fluid, passes.

Figure 2:
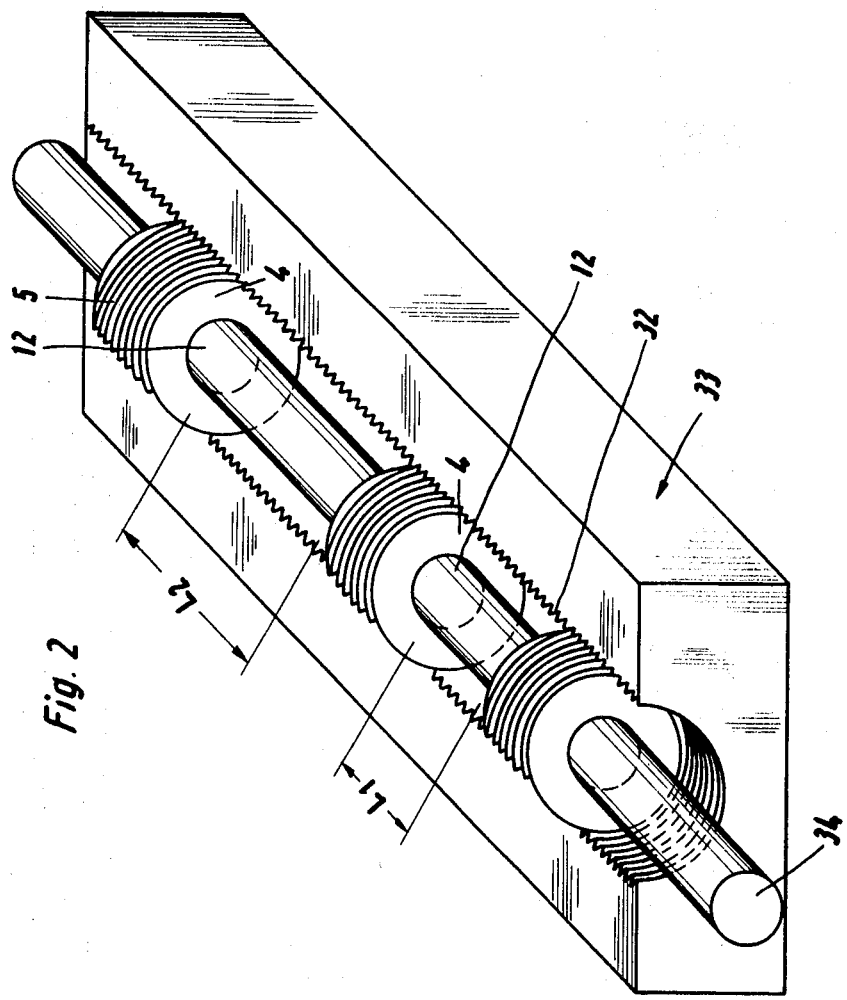
FIG. 2 shows an isometric view of an auxiliary jig for the introduction of sleeves into the thread bore of the housing.

FIG. 2 shows an auxiliary arrangement for the introduction of sleeves 4 into the housing. A boat 33 provided with internal thread or groove 32 made of steel, synthetic resin, or similar material serves to provide the exact spacings $L_1$ and $L_2$ of sleeves 4 from one another. For this purpose, the sleeves 4 are placed into boat 33, and their distances $L_1$ and $L_2$ measured optically or mechanically. This arrangement must be extremely exact, because the bores of sleeves 4 later function as guiding edges. If larger series of a multipassage valve are being made, a special bowl with stops or spacers (not shown) is used as auxiliary device in the thread paths. Second check measurements are then no longer required. When the sleeves 4 have been aligned, a spreading thong 34 is inserted into their bores. The sleeves are lifted together with spreading thong 34 from the groove 32 and covered with a hardenable, liquid synthetic resin adhesive 16 (FIG. 1) at their outer thread 5. The sleeves 4 are then screwed into thread 5 together with the spreading thong 34, whereby distances $L_1$ and $L_2$ are exactly maintained. After the synthetic substance has hardened, spreading thong 34 is removed.

Figure 3:
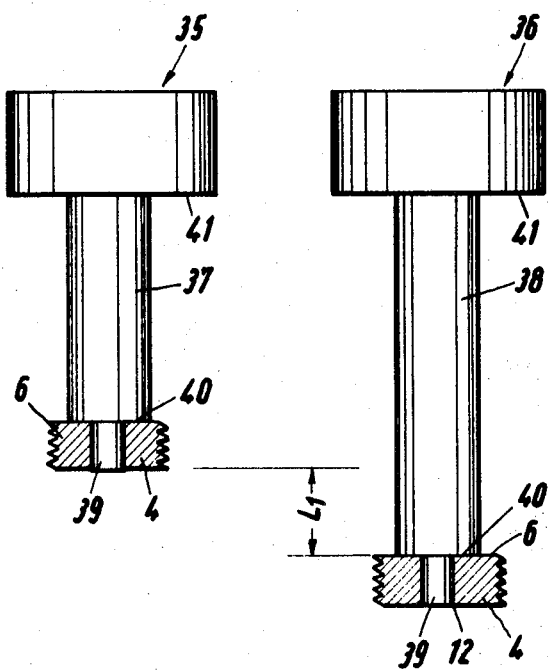
FIG. 3 shows an elevation view, partly in section, of thongs for the insertion of the sleeves into the threaded bore of the housing.

FIG. 3 shows two thongs 35 and 36 with different shaft lengths 37 and 38 for the engagement of sleeves 4 with thread 3 of housing 1. Sleeve 4 is mounted on shaft part 39 by means of its bore 12. Its frontal side 6 abuts stop 40. The sleeve 4, together with the thong 34, is screwed into the thread 3 of housing 1. The sleeve has been exactly fitted into thread 3 when stop 41 of the thong 37 or 38 abuts an accurately machined surface (not shown) of housing 1. The thong is removed and the next sleeve with a thong of a different shaft length is introduced. When all of the sleeves 4 have been screwed into thread 3, a centering needle (not shown) or a finished sliding piston 13 is introduced into their bores 12, which aligns sleeves 4 until the synthetic adhesive 16 has hardened and cemented sleeves 4 in place, spaced a predetermined distance from each other.

The sleeves 4, as described above, are brought into exact alignment relative to each other by a suitable synthetic resin adhesive 16 which hardens during the manufacturing process. No special tolerance requirements need be imposed on the bore thread 3 in housing 1 or the thread 5 of sleeves 4. The internal bores 12 of the individual sleeves 4 are not very long, thus they can be easily machined to a high degree of roundness and quality of surface. When sleeves 4 are bored, no particular attention need be paid to high degree of accuracy of the bore diameters, because after completion of their machining the sleeves are conveniently sorted, for instance, by the air measure method. Especially with pistons having the relatively smallest dimensions, economical mass production can be achieved in this manner.

Piston valves of this invention can be advantageously manufactured by a method characterized by aligning sleeves 4, prior to their introduction into the internally threaded housing 1, into a jog such as boat 33 having a semicylindrical cavity with internal threading 32, and in the ultimate axial arrangement desired, fixing them in position relative to each other by means of a spreading thong 34, covering the outer thread 5 thereof with a hardenable synthetic adhesive 16 in plastic or liquid form, and threadedly engaging sleeves 4 with the internal thread 3 of housing 1 at the desired location therein while the sleeves are held by the thong. After sleeves 4 have been screwed in they remain centered by means of the spreading thong 34 until the synthetic adhesive 16 has hardened.

The small number of assembly steps considerably reduces the manufacturing cost of piston valves. No time and equipment has to be wasted to measure and check the alignment of the bore, and a high degree of accuracy in alignment is assured tin each case. The exact spacing of the frontal planes 6 and 7 of sleeves 4, which form the guiding edges of the piston valve, is thus assured.

Another advantageous method for the manufacture of the piston valve is characterized in that each sleeve 4 is covered with a hardenable synthetic resin adhesive 16, is mounted individually on a thong 35 or 36 fitted with a stop 40; and sleeve 4 is then screwed with the thong into the internal thread 3 of housing 1 until a second stop 41 on the thong touches an accurately machined reference surface of the housing. Thereafter the thong is removed, and after the introduction of all sleeves the sliding piston 13 is inserted into the sleeve bores 12 thereby aligning them while the synthetic adhesive 16 is hardening.

The thongs provide for the fully automatic introduction of the sleeves and greatly increase the economy of the manufacturing process of a large series of valves.

The foregoing discussion and the drawings are intended to be illustrative. Still other variations and arrangements of parts within the spirit and scope of this invention will present themselves to a skilled artisan.

I claim:
1. A piston valve comprising:
   an elongated, internally threaded tubular valve housing provided with a plurality of passageways communicating therewith;
   a plurality of spaced, externally threaded sleeve members threadedly received in said housing and defining a pressure chamber therebetween, said pressure chamber communicating with at least one of said passageways;
   a hardenable cementitious material sealingly interposed between the threads of said housing and of each of said sleeve members; and
   an axially extending piston means slidably received in said sleeve members and adapted to effect communication between at least two passageways via said pressure chamber.

2. The piston valve in accordance with claim 1 wherein the passageways are axially spaced and substantially transverse to said tubular valve housing.

3. The piston valve in accordance with claim 1 wherein the axially extending piston means is hydraulically operated.

4. The piston valve in accordance with claim 1 wherein the axially extending piston means is pneumatically operated.

5. The piston valve in accordance with claim 1 wherein the axially extending piston means is electromechanically operated.